United States Patent
Bass et al.

(10) Patent No.: US 6,587,471 B1
(45) Date of Patent: *Jul. 1, 2003

(54) METHODS, SYSTEMS AND COMPUTER PROGRAM PRODUCTS FOR SUPPRESSING MULTIPLE DESTINATION TRAFFIC IN A COMPUTER NETWORK

(75) Inventors: Brian Mitchell Bass, Apex, NC (US); Michael Steven Siegel, Raleigh, NC (US); Norman Clark Strole, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/707,361

(22) Filed: Nov. 7, 2000

Related U.S. Application Data (63) Continuation of application No. 08/976,430, filed on Nov. 21, 1997, now Pat. No. 6,185,185.

(51) Int. Cl.[7] .............................................. H04B 7/212
(52) U.S. Cl. ........................................ 370/432; 370/312
(58) Field of Search ................................ 370/230, 235, 370/252, 253, 351, 400, 398, 465, 312, 395.72, 329, 414, 232, 236, 368, 399, 412, 229, 390, 432

(56) References Cited

U.S. PATENT DOCUMENTS

| | | | | |
|---|---|---|---|---|
| 5,140,584 A | * | 8/1992 | Suzuki | 370/230 |
| 5,282,203 A | | 1/1994 | Ooouchi | 370/94.1 |
| 5,414,650 A | * | 5/1995 | Hekhuis | 370/230 |
| 5,463,620 A | | 10/1995 | Sriram | 370/60 |
| 5,530,695 A | | 6/1996 | Dighe et al. | 370/17 |
| 5,574,720 A | | 11/1996 | Lee | 370/252 |
| 5,604,867 A | | 2/1997 | Harwood | 395/200.13 |
| 5,636,345 A | | 6/1997 | Valdevit | 395/200.11 |
| 5,703,870 A | * | 12/1997 | Murase | 370/232 |
| 5,710,770 A | * | 1/1998 | Kozaki et al. | 370/368 |
| 5,726,987 A | * | 3/1998 | Uriu et al. | 370/230 |
| 5,742,606 A | | 4/1998 | Lliadis et al. | 370/413 |
| 5,761,191 A | | 6/1998 | VanDervort et al. | 370/232 |
| 5,764,645 A | | 6/1998 | Bernet et al. | 370/466 |
| 6,134,218 A | * | 10/2000 | Holden | 370/232 |
| 6,185,185 B1 | * | 2/2001 | Bass et al. | 370/230 |

FOREIGN PATENT DOCUMENTS

EP 9638956 12/1996 ............ H04L/12/26

* cited by examiner

*Primary Examiner*—Dang Ton
*Assistant Examiner*—Phuc Tran
(74) *Attorney, Agent, or Firm*—Carlos Munoz-Bustamante

(57) ABSTRACT

Methods, systems and computer program products are provided which control message storms in a network by classifying multiple destination messages into a plurality of broadcast message classes based upon characteristics of the broadcast messages. The number of multiple destination messages for each class of broadcast messages of the plurality of classes of broadcast messages are then counted so as to provide a plurality of broadcast message class counts. Multiple destination messages of a class of broadcast messages are then selectively transmitted based upon the broadcast message class count for the class of broadcast messages.

7 Claims, 7 Drawing Sheets

METHODS, SYSTEMS AND COMPUTER PROGRAM PRODUCTS FOR SUPPRESSING MULTIPLE DESTINATION TRAFFIC IN A COMPUTER NETWORK

This application is a Continuation of Ser. No. 08/976,430 filed Nov. 21, 1997, now U.S. Pat. No. 6,185,185, issued and assigned to the same assignee as that of the present invention.

FIELD OF THE INVENTION

The present invention relates to local area networks, and more particularly to the control of multiple destination messages in computer networks.

BACKGROUND OF THE INVENTION

A computer network is a collection of a number of computers which communicate via a network interface. Typically, this network interface employs a layered communication protocol such as the Transport Control Protocol/Internet Protocol (TCP/IP) or other such communication protocols. Computers then communicate using the communication protocol by sending messages to other computers in the network. Often, these messages are in the form of "packets" of data which typically include a destination address of the computer to receive the data contained in the packet. Layered protocols also often allow for multiple destinations to be specified for a message. Multiple destination messages include broadcast messages (messages which are sent to every computer in the network and/or attached networks) and multi-cast messages (messages which are sent to a specified subset of computers in the network or attached networks).

One difficulty which may arise when multiple destination messages are utilized by a network communications protocol are what is referred to as "broadcast storms." Broadcast storms occur when multiple broadcast or multi-cast messages are generated at approximately the same time. This sudden increase in communications traffic to all or a substantially all of the nodes in the network or networks can result in congestion problems such as buffer overrun in switches, routers or other network interconnection devices.

Previous attempts to reduce broadcast storms include those described in the O'Connell et al. PCT Application WO96/38956. In O'Connell et al., a management entity monitors traffic through all ports of a switch or bridge and compiles statistics on the number of occasions multicast/broadcast data is being supplied. From either the total or supplied data or both the management entity makes a decision as to whether to permit a further multicast/broadcast message to pass through the switch or bridge. If further multicast/broadcast messages are not to pass through the switch or bridge the messages are routed to a non-existent port.

While the O'Connell et al. system may prevent broadcast storms by determining the total broadcast/messages through a switch, the system also prevents what may be essential messages from being transmitted through the switch. Thus, for example, a critical broadcast message may be routed to the non-existent port simply because it came after a large number of non-critical messages. Furthermore, the O'Connell et al. system does not reduce the network traffic associated with broadcast/multicast messages on the networks where the messages originate but simply prevents propagation of the messages to other networks through the switch or bridge.

Additional mechanisms which relate to congestion problems in various communications systems are illustrated in U.S. Pat. No. 5,636,345, U.S. Pat. No. 5,604,867, U.S. Pat. No. 5,463,620, U.S. Pat. No. 5,282,203, and U.S. Pat. No. 5,530,695. In addition, an existing IBM product, the IBM 8271 Ethernet LAN Switch, contains a broadcast suppression scheme that indiscriminately discards all broadcast packets when a user defined threshold is exceeded. These mechanisms, however, generally have some or all of the same limitations as the O'Connell system.

In light of the above discussion, a need exists for improvements in the prevention or suppression of broadcast traffic in computer networks.

SUMMARY OF THE INVENTION

In view of the above discussion, it is an object of the present invention to reduce the likelihood of broadcast storms in a computer network or networks.

A further object of the present invention is to selectively suppress multiple destination messages in a computer network so as to avoid broadcast storms.

Another object of the present invention is to avoid network bandwidth utilization by messages which will be suppressed.

Still a further object of the present invention is to avoid broadcast storms while still allowing critical messages to be transmitted throughout a network or networks.

These and other objects of the present invention are provided by methods, systems and computer program products which control message storms in a network by classifying multiple destination messages into a plurality of broadcast message classes based upon characteristics of the broadcast messages. The number of multiple destination messages for each class of broadcast messages of the plurality of classes of broadcast messages are then counted so as to provide a plurality of broadcast message class counts. Multiple destination messages of a class of broadcast messages are then selectively transmitted based upon the broadcast message class count for the class of broadcast messages.

By classifying and then selectively transmitting multiple destination messages, message storms may be suppressed. Furthermore, because the selective transmission of messages is based on the class of the message multiple destination messages are differentially transmitted which prevents one class of broadcast messages from dominating usage of available resources.

In a particular embodiment of the present invention, multiple destination messages are received at a network device for retransmission by the network device. The received multiple destination messages are categorized into one of the broadcast message classes. It is then determined if the broadcast message class count for the broadcast message class of the received message exceeds a predefined threshold. The multiple destination message is retransmitted if the class count for the broadcast message class of the received multiple destination message does not exceed the predefined threshold. Furthermore, the class counts may be reset after a predefined time interval and a universal count parameter may be updated with the class counts prior to resetting the class counts.

In determining if the received multiple destination message is a multiple destination message, the network device may determine if the message is a broadcast message or a multicast message. Furthermore, the broadcast message classes may include any classification that may be defined from characteristics of the multiple destination message.

In determining the class counts, the class count of the broadcast message class corresponding to the received multiple destination message may be incremented after the message is received. Furthermore, where the network device has multiple ports, a class count for the broadcast message classes is associated with each port of the network device. The class count associated with a port of the device is then incremented for the broadcast message class of a multiple destination message received by the port. The class count associated with the port of the device is also incremented for the broadcast message class of multiple destination messages received by the port from another port of the device. Thus, the class counts include both messages received from the network associated with a port as well as messages received from other ports of the device.

Multiple destination messages of a broadcast message class are discarded by the device if the class count corresponding to the broadcast message class of the multiple destination messages exceeds a predefined threshold. However, if a multiple destination message has associated with the message a discard override, then the multiple destination message may be retransmitted is irrespective of the class count. Furthermore, if a priority associated with the multiple destination message exceeds a predefined priority threshold, then the multiple destination message may also be retransmitted irrespective of the class count.

By discarding messages based on the class count of the message, the present invention allows for increased control of multiple destination messages without preventing essential messages from being transmitted. Furthermore, the priority and discard overrides of the present invention may allow messages to be transmitted even if the class count of the message exceeds a predefined threshold. Such selective control of the discarding of messages allows the present invention better sensitivity to high priority messages while still maintaining the ability to suppress messages to prevent message storms.

The benefits of the present invention may also be obtained in an alternative network interface embodiment of the present invention. In such an embodiment, network traffic is monitored so as to create class counts of messages for the plurality of broadcast message classes. Requests to transmit a multiple destination message onto a network are received by a network interface and categorized to determine the broadcast message class of the request. If the class count corresponding to the broadcast message class of the multiple destination message request does not exceed a predefined threshold, then the multiple destination message corresponding to the multiple destination message request is transmitted.

Thus, by monitoring network traffic, multiple destination messages which may result in a message storm may be prevented from being originated by a workstation or other device associated with the network interface. Preventing multiple destination messages from being transmitted on the originating network increases the available bandwidth on all networks rather than just destination networks as is the case where suppression of the messages occurs at a network device.

In particular embodiments of the present invention, the network traffic is monitored by categorizing a multiple destination message received from the network by the network interface card into one of the plurality of broadcast message classes. The class count corresponding to the received multiple destination message is then incremented for the received message. Similarly, a multiple destination message transmitted by the network interface card is categorized into one of the plurality of broadcast message classes. The class count for the broadcast message class corresponding to the multiple destination message request received by the network interface card is also incremented for the transmitted message. The class counts for the broadcast message classes of the network interface may also be reset after a predefined time interval and a universal count parameter may be updated with the class counts prior to said step of resetting the class counts. The network interface may also utilize the discard override and priority control mechanisms to transmit multiple destination messages irrespective of the class count of the message.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is also described herein with reference to flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 1:
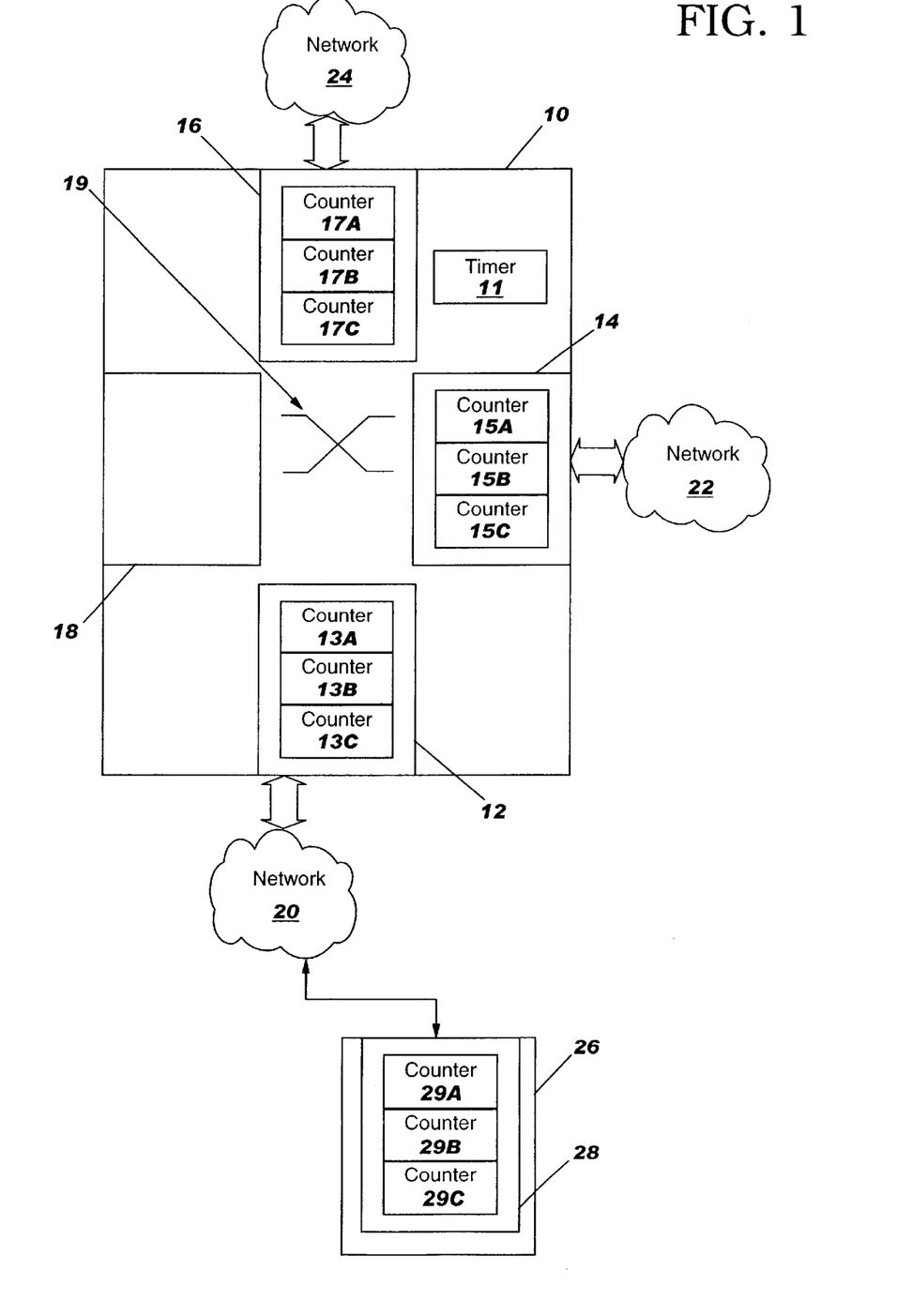
FIG. 1 is block diagram of a network configuration utilizing one embodiment of the present invention.

FIG. 1 illustrates one network configuration utilizing the present invention. As seen in FIG. 1, a network switch 10 includes several ports 12, 14, 16 and 18 which interconnect several computer networks 20, 22 and 24 through an switch mechanism 19. Also illustrated in FIG. 1 is a computer or other workstation 26 which communicates to network 20 through a network interface 28. The computer 26 utilizes a communications protocol, such as TCP/IP, which allows for multiple destination messages to communicate with other computers in network 20 and with computers in network 22 and/or network 24.

As is further illustrated in FIG. 1, each active port of switch 10 has associated with it a plurality of counters. These counters are associated with classes of multiple destination messages which are referred to herein as broadcast message classes. Thus, if three broadcast message classes are defined, then each port would have three counters. Thus, port 12 has associated with it three class count counters 13A, 13B and 13C. Likewise, ports 14 and 16 have associated with them three class count counters 15A, 15B and 15C and 17A, 17B and 17C respectively. These class counters maintain counts of the number of multiple destination messages of each broadcast message class which are received or transmitted by the port.

Switch 10 also illustrates a timer 11 which is utilized to reset the class counters 13A, 13B, 13C, 15A, 15B, 15C, 17A, 17B and 17C after a predetermined time period. The timer may be implement in any number of manners known to those of skill in the art. The duration of the timer is preferably selected in combination with predefined threshold values associated with each broadcast message class. The predefined threshold values are selected in combination with the predetermined time period to suppress multiple destination message of a broadcast message class if the threshold value is reached within the predetermined time period, thus avoiding broadcast storms.

As is further illustrated in FIG. 1, network interface 28 may also include counters 29A, 29B and 29C which correspond to broadcast message classes. These counters 29A, 29B and 29C are used to monitor both requests for multiple destination messages to the network interface 28 and multiple destination messages received by the network interface 28.

In operation, a multiple destination message would be generated by, for example, computer 26 and sent across network 20 to switch 10. The message is received at port 12 of switch 10 and forwarded to port 14 if the message is directed to network 22 or to port 16 if the message is directed to network 24 or to both port 14 and port 16 if the message is directed to both network 22 and network 24. Thus, the message may be selectively retransmitted onto one or both of networks 22 and 24 through ports 14 and 16 depending on the addresses associated with networks 22 and 24 and the destination addresses of the message.

Conventionally, all messages would be passed from the receiving port to the transmitting port or ports irrespective of the message type. However, according to the present invention, multiple destination messages may be selectively discarded based upon the nature of the multiple destination message and a history of multiple destination messages of the same class so as to avoid broadcast storms. The operations carried out by switch 10 for the selective transmission of multiple destination messages are described below with reference to FIGS. 2, 3 and 6.

In generating a multiple destination message, a medium access control layer of the network interface 28 would conventionally generate a message on network 20 for all requests from higher layers of the communications protocol. However, according to the present invention, the multiple destination traffic on network 20 generated by computer 26 may be controlled by selectively honoring requests for multiple destination messages by higher protocol layers based upon traffic on network 20 and the nature of the message requested. Thus, a broadcast storm may be avoided by preventing the generation of multiple destination messages at the source computer. Furthermore, by coordinated use of the mechanisms in the network interface 28 and switch 10 the generation of multiple destination messages which are likely to be discarded by switch 10 may be avoided. The operations carried out by network interface 28 for the selective transmission of multiple destination messages are described below with reference to FIGS. 4 through 6.

Figure 2:
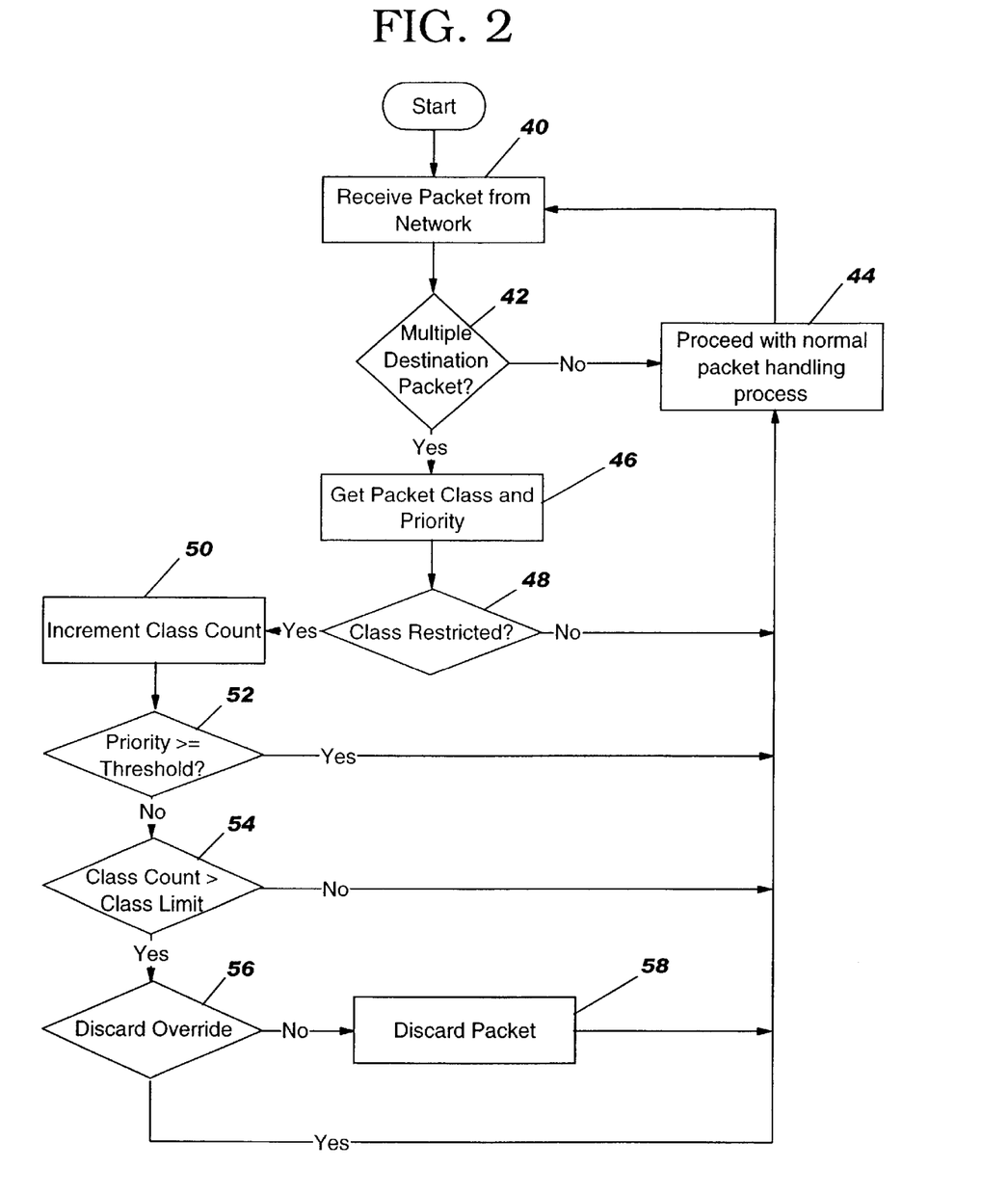
FIG. 2 is a flowchart illustrating operations carried out on receipt of a multiple destination message by a multi-port switch according to one embodiment of the present invention.

FIG. 2 illustrates the operation of switch 10 according to the present invention. As seen in FIG. 2 a packet (message) is received from the network (block 40) by a port of switch 10, such as port 12. Switch 10 first determines if the packet is a packet of a multiple destination message. (block 42). If the packet is not a packet of a multiple destination message, then the packet is processed normally and forwarded on the appropriate destination port (block 44).

After determining whether the packet is a packet of a multiple destination message, the switch 10 determines the broadcast message class of the packet and the priority of the packet (block 46). A broadcast message class may be user defined and may distinguished, for example, based on a destination MAC address, a multicast bit or subfield within the destination MAC address, a bit or subfield within the Source Route Information Field (RIF), the Destination Service Access Point (DSAP) field of the routing header (e.g. TCP/IP, IPX, etc.), a Virtual LAN (VLAN) id within the frame header, an all stations IP address, a multicast, group or functional address, the link layer service access point, IP header information, priority or other addressing or routing information. Several broadcast message classes will typically be defined such that multiple destination messages received by switch 10 are classified into one of a plurality of broadcast message classes. As will be appreciated by those of skill in the art, any number of mechanisms for classifying multiple destination messages into broadcast message classes may be utilized. Accordingly, the present invention should not be construed as limited to the present examples.

As is further illustrated in block 46, the priority of the packet may also be determined. In TCP/IP, this priority may be determined by examining the precedence portion of the type of service field of the IP datagram. Alternatively, priorities based upon the MAC layer priority as well as other priorities may be utilized. As will be appreciated by those of skill in the art, any number of mechanisms for determining priority of a packet of a multiple destination message may be utilized. Accordingly, the present invention should not be construed as limited to the present examples.

After determining the broadcast message class and priority of a received packet, it is determined within switch 10 if the multiple destination packet is from a class which is restricted (block 48). As will be appreciated by those of skill in the art, references to determinations or actions by switch 10 may be carried out by a central mechanism within switch 10 or may be distributed and carried out by each port or active port associated with switch 10. If the received packet is not of a restricted broadcast message class then the packet is processed normally (block 44). A restricted class is a class for which the messages of that class may be discarded. If the multiple destination packet does correspond to a restricted class, then the switch 10 increments the counter corresponding to the broadcast message class of the multiple destination packet (block 50). Thus, for example, if counter 13A corresponds to a first broadcast message class and port 12 receives a packet of the first broadcast message class, then counter 13A will be incremented. As is described above, preferably a counter exists for each restricted broadcast message class. Also, preferably, a separate counter is utilized for each port of the switch 10 such that each port maintains its own count for each restricted broadcast message class.

After incrementing the class count of the broadcast message class of the packet, switch 10 then determines if the priority of the packet is greater than a predefined threshold (block 52). If the priority is greater than a predefined priority threshold, then the packet is processed normally (block 44). However, if the priority is less than the predefined priority threshold, then the switch 10 determines if the class count of the broadcast message class for the port at which the packet is received is greater than a predefined class limit (block 54). If the class limit has not been reached for the broadcast message class of the packet, then the packet is processed normally (block 44).

If the class count of the broadcast message class has been exceeded then the switch 10 checks to see if the discard override is set for the packet (block 56). The discard override may be a bit or series of bits set in a control register in the switch 10 and may be associated, for example, with each multicast class, specific ports of the switch, or a specific source address of a packet. If the discard override is set, then the packet is processed normally (block 44). If the discard override is not set, then the packet is discarded (block 58).

Figure 3:
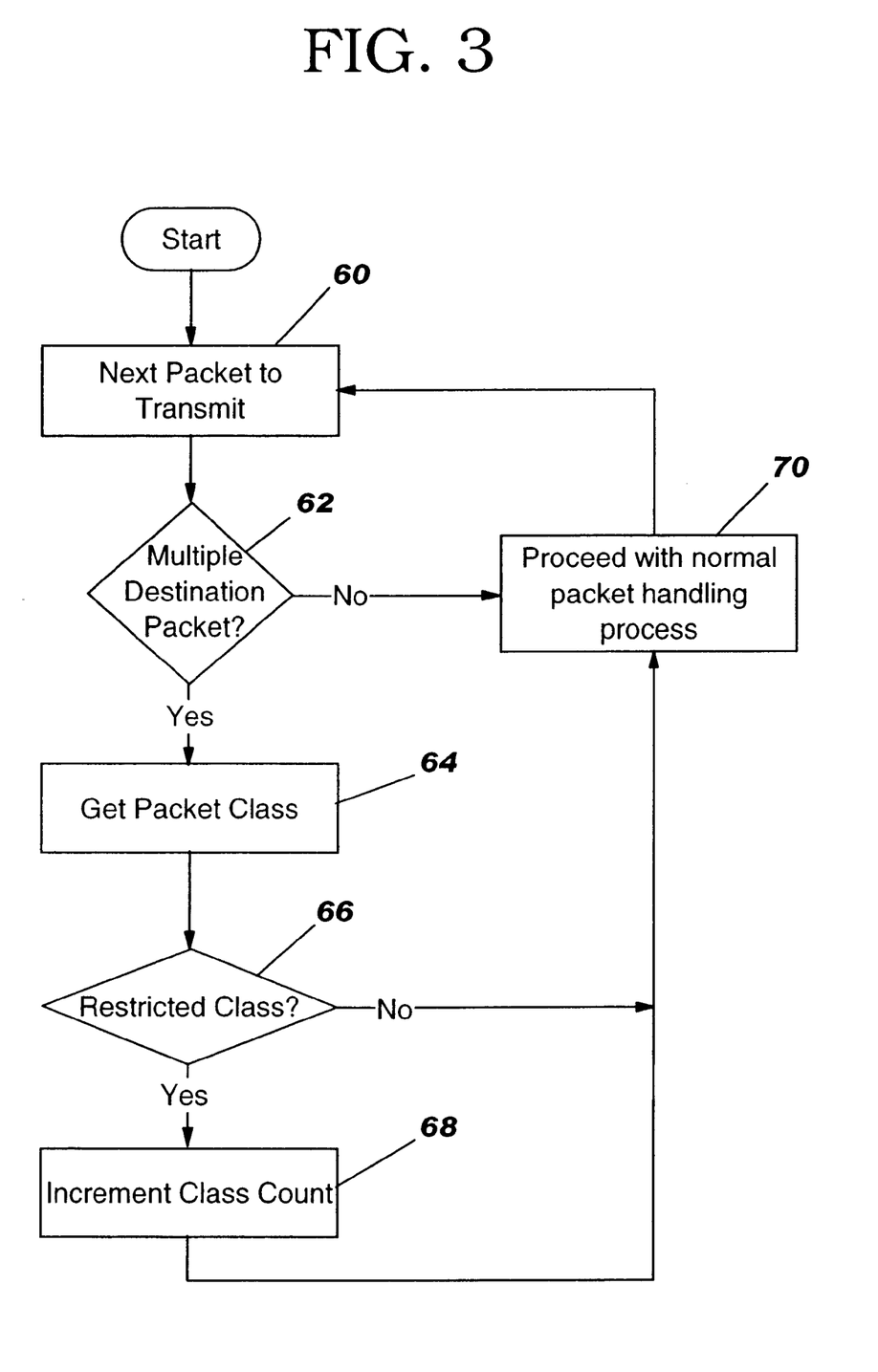
FIG. 3 is a flowchart illustrating operations carried out on receipt by a port of a multiple destination message from another port of a multi-port switch according to one embodiment of the present invention.

When a packet is processed normally in switch 10, the packet is forwarded from the receiving port to a transmitting port via the internal switch mechanism 19 for retransmission onto a network. The operations of the transmitting port are illustrated in FIG. 3. As seen in FIG. 3, when a packet is received for transmission (block 60), the switch determines if the packet is a multiple destination packet (block 62). If the packet is not a multiple destination packet then the transmitting port of switch 10 proceeds with normal packet handling (block 70). If the packet is a multiple destination packet, then switch 10 determines the broadcast message class of the packet (block 64) and determines if the broadcast message class is a restricted message class for the transmitting port (block 66).

If the broadcast message class is not a restricted message class, then the packet is processed normally (block 70). If the broadcast message class is a restricted message class, then a class count exists for the message class for the transmitting port. This class count of the transmitting port for the broadcast message class of the packet is then incremented by the transmitting port (block 68). The packet is then processed normally (block 70). Thus, the class counts of ports 12, 14 and 16 of switch 10 include the number of multiple destination packets in a restricted broadcast message class which are either transmitted or received by the port. In addition to the individual class counts, a total message count could also be maintained by the switch 10. In such a case if either the broadcast message class or the total class count was exceeded and neither an override or priority allowed transmission of the message, then the message would be discarded.

Figure 4:
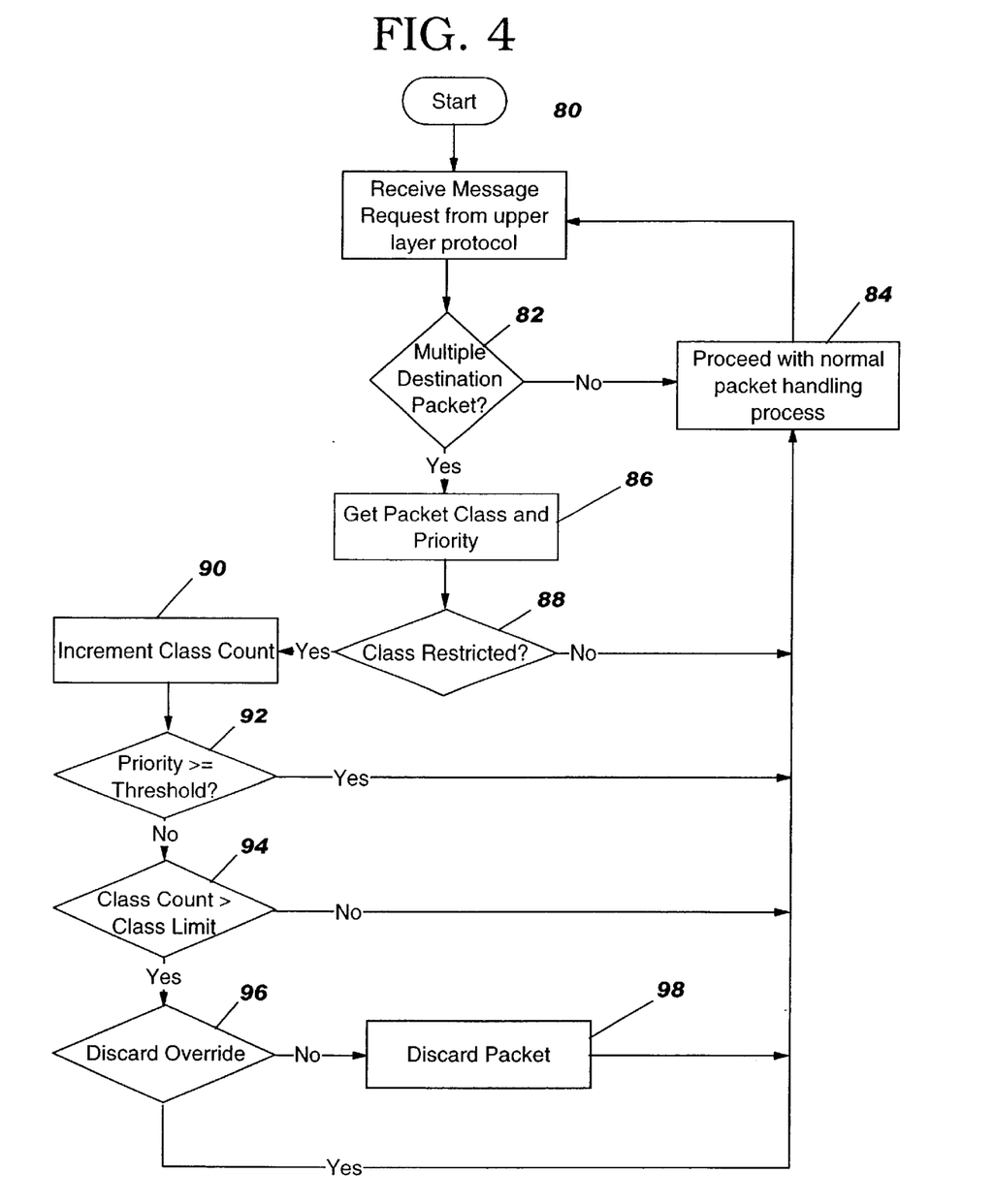
FIG. 4 is a flowchart illustrating operations carried out on receipt of a request for generation of a multiple destination message by a network interface layer according to one embodiment of the present invention.

As is briefly discussed above, the teachings of the present invention may be equally applied to network interfaces to suppress broadcast storms. FIG. 4 illustrates the operation of network interface 28 according to the present invention. As seen in FIG. 4 a request to transmit a message is received (block 80) by network interface 28 from a higher layer of the communications protocol. Network interface 28 first determines if the request for a message is a request for a multiple destination message (block 82). If the request is not a request for a multiple destination message, then the request is processed normally (block 84). As will be appreciated by those of skill in the art, any number of methods of determining if the request for a message requests a multiple destination message, including evaluation of the requested destination address and addressing type.

After determining whether the request is a request for a multiple destination message, the network interface 28 determines the broadcast message class of the requested message and the priority of the requested message (block 86). A broadcast message class may be user defined and may be distinguished as described above.

As is further illustrated in block 86, the priority of the packet may also be determined. After determining the broadcast message class and priority of the requested message, the network interface 28 then determines if the multiple destination message is from a class which is restricted (block 88). If the requested message is not of a restricted broadcast message class then the message is processed normally (block 84). A restricted class is a class for which the messages of that class may be discarded. If the multiple destination message does correspond to a restricted class, then the network interface 28 increments the counter corresponding to the broadcast message class of the multiple destination message (block 90). As is described above with respect to switch 10, preferably a counter exists in network interface 28 for each restricted broadcast message class.

After incrementing the class count of the broadcast message class of the requested message, network interface 28 then determines if the priority of the requested message is greater than a predefined threshold (block 92). If the priority is greater than a predefined priority threshold, then the packet is processed normally (block 84). However, if the priority is less than the predefined priority threshold, then the network interface 28 determines if the class count of the broadcast message class is greater than a predefined class limit (block 94). If the class limit has not been reached for the broadcast message class of the requested message, then the request is processed normally (block 84).

If the class count of the broadcast message class has been exceeded, then the network interface 28 checks to see if the discard override is set for the request (block 96). The discard override may be a bit or series of bits set in a control register in the network interface 10 and may be associated, for example, with each multicast class. If the discard override is set, then the request is processed normally (block 84). If the discard override is not set, then the request is discarded and not processed (block 98).

Figure 5:
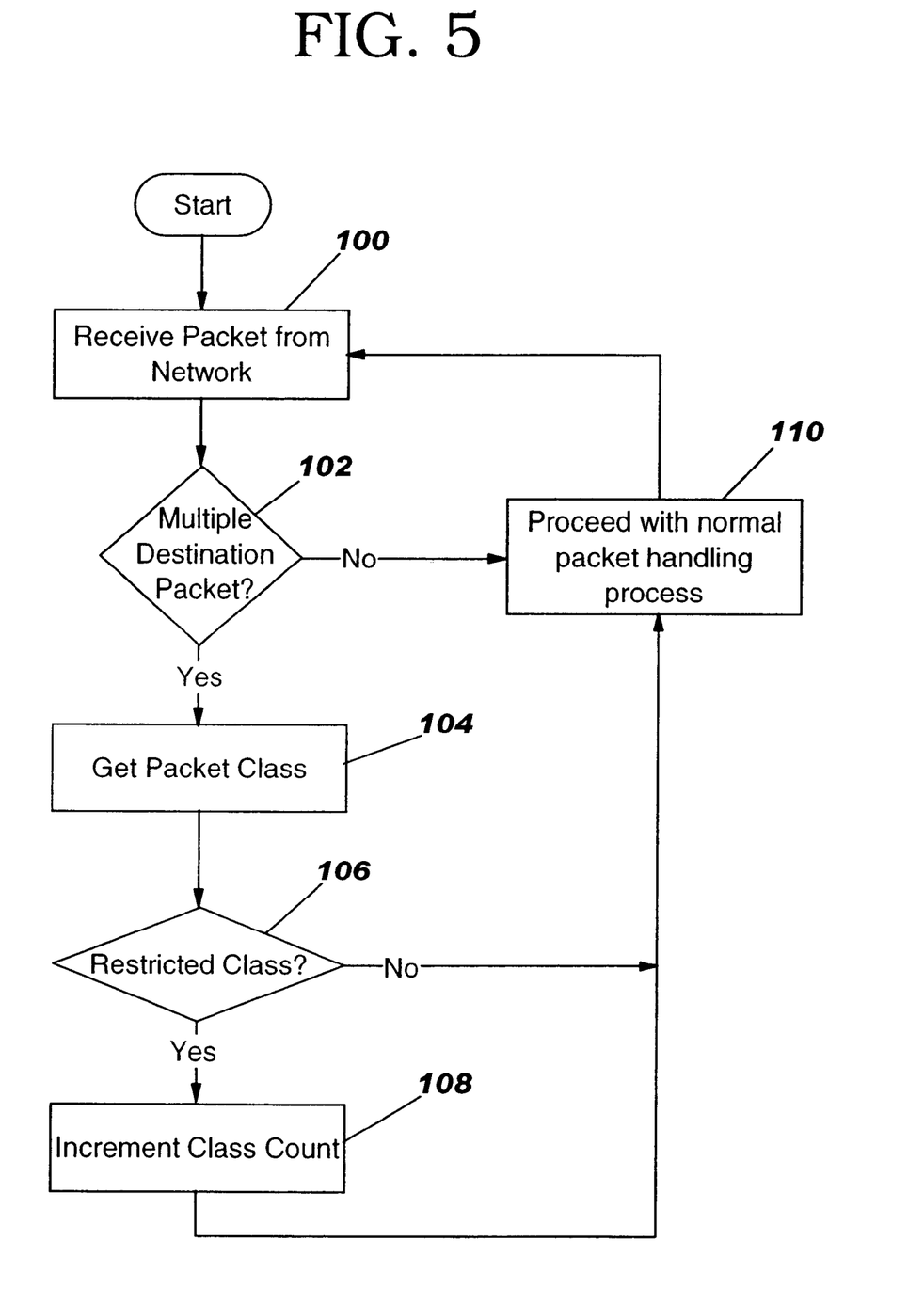
FIG. 5 is a flowchart illustrating operations carried out on receipt of a multiple destination message by a network interface layer according to one embodiment of the present invention.

In addition to categorizing and counting requests for messages, the network interface 28 also categorizes and counts multiple destination messages received from the network by the network interface 28. The operations of the network interface 28 in receiving multiple destination messages (packets) are illustrated in FIG. 5. As seen in FIG. 5, when a packet is received from the network by network interface 28 (block 100), the network interface 28 determines if the packet is a multiple destination packet (block 102). If the packet is not a multiple destination packet then the network interface 28 proceeds with normal packet handling (block 110). If the packet is a multiple destination packet, then network interface 28 determines the broadcast message class of the packet (block 104) and determines if the broadcast message class is a restricted message class for the network interface 28 (block 106).

If the broadcast message class is not a restricted message class, then the packet is processed normally (block 110). If the broadcast message class is a restricted message class, then a class count exists for the message class at the network interface 28. This class count for the broadcast message class of the packet is then incremented by the network interface 28 (block 108). The packet is then processed normally (block 110). Thus, the class counts of network interface 28 include the number of multiple destination packets in a restricted broadcast message class which are either transmitted or received by the network interface 28.

In addition to the individual class counts, a total message count could also be maintained by the switch 10. In such a case if either the broadcast message class or the total class count was exceeded and the discard override was not set or transmission allowed based on the priority of the message, then the message would be discarded.

Figure 6:
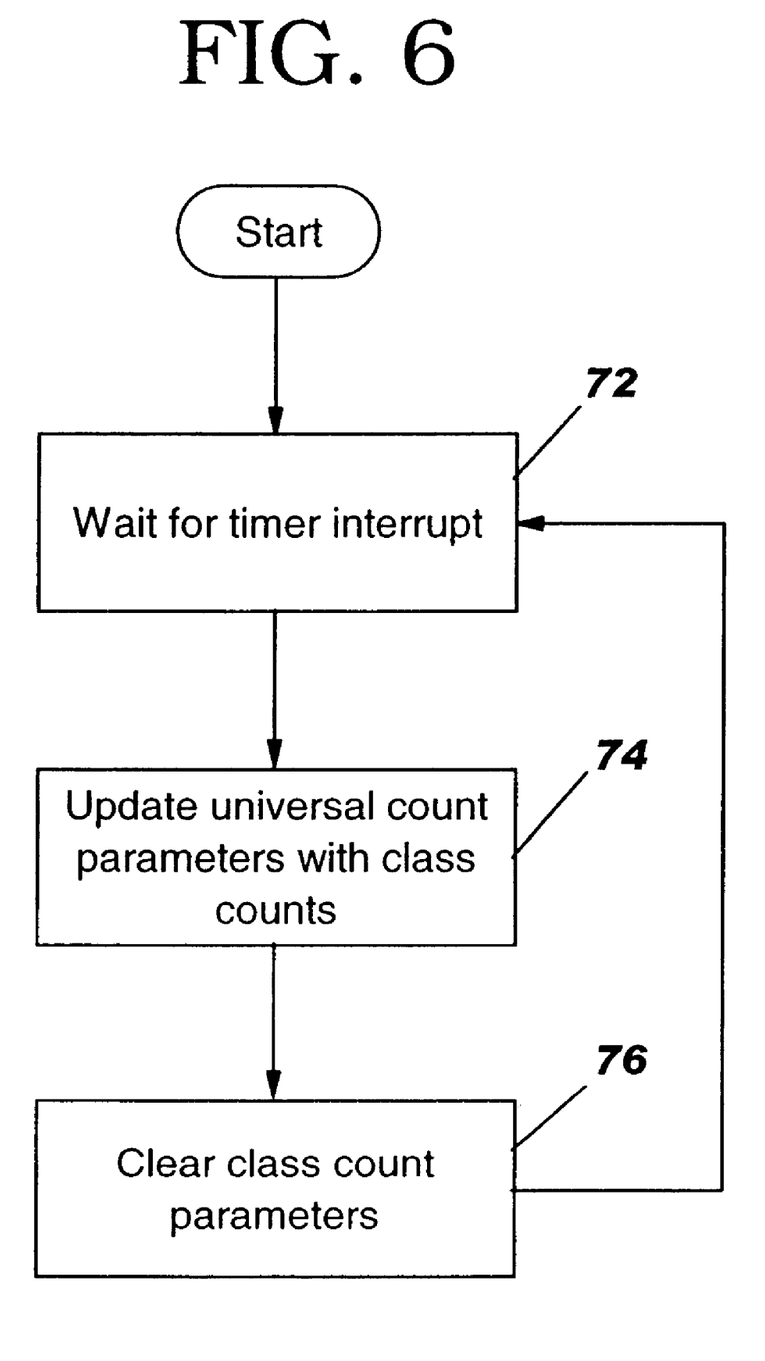
FIG. 6 is a flowchart illustrating timing operations carried out according to one embodiment of the present invention.
Figure 7:
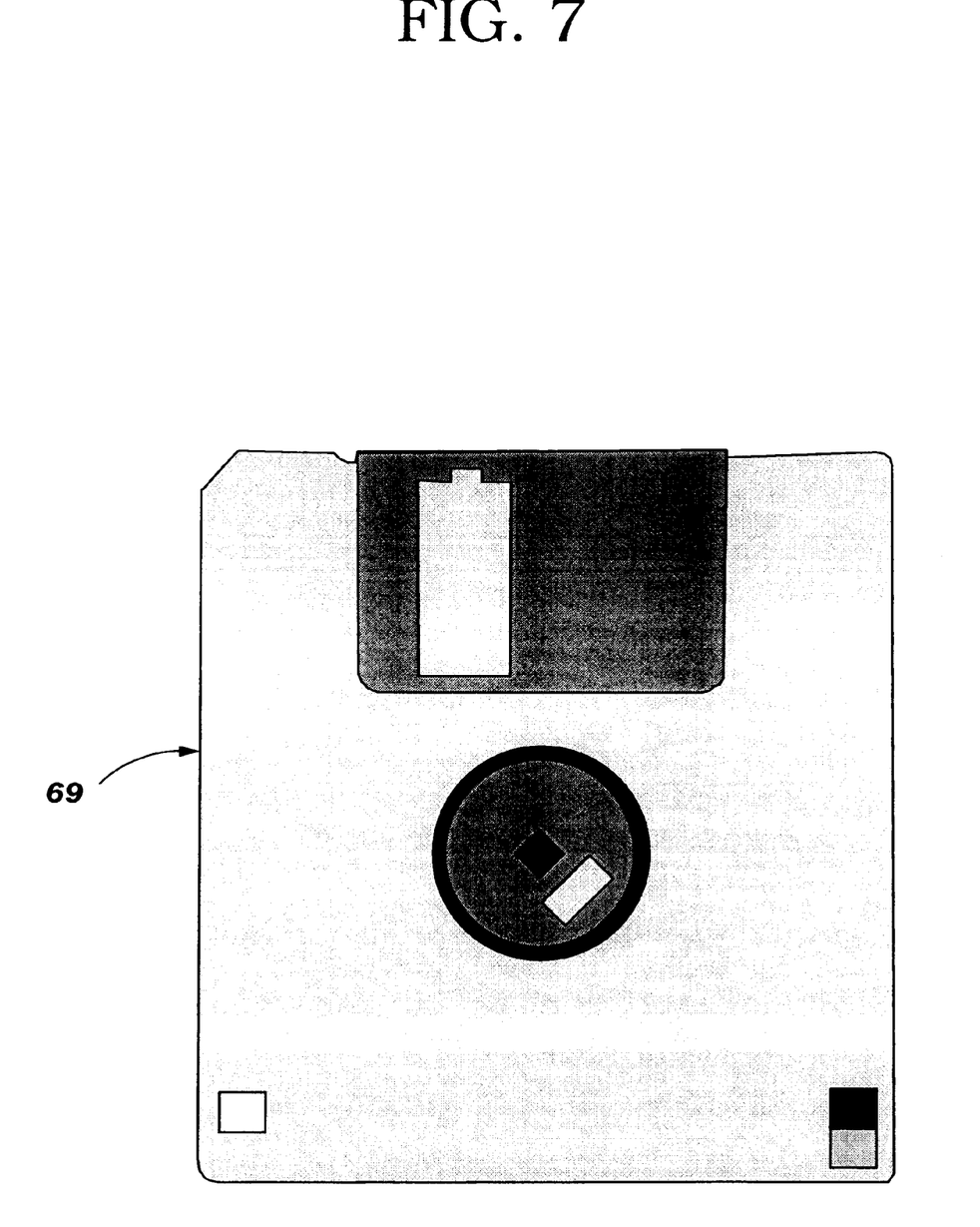
FIG. 7 depicts the diskette on which programs can be recorded.

FIG. 6 illustrates the reset operation for the class counts for either switch 10 or network interface 28. As is seen in FIG. 6, each port 12, 14, and 16 or network interface 28 with a restricted class count waits for a timer interrupt (block 72). In the case of the ports 12, 14 and 16, this timer interrupt may come from timer 11. For the network interface, the timer interrupt may come from a timer internal to the network interface or from a programmable timer of the processing system utilizing the network interface. However, in either case, any number of timer interrupt mechanisms known to those of skill in the art may be employed.

After the timer interrupt is received, a universal count parameter may be updated with the class count information (block 74). This information may be utilized to keep statistical information on the number of packets discarded or other such information. The universal class count may be kept per class, per port, per switch, per network interface or in any manner which retains the desired information. Furthermore, the universal class count need not be kept if historical information is not needed. Thus, the operations of block 74 may be considered optional.

After updating the universal class count, the class count parameters may then be cleared (block 76). The switch or network interface then waits for the next timer interrupt (block 72). Thus, the class counts are periodically reset at a predefined interval. Exact intervals should be coordinated with the threshold values and may be revised dynamically through analysis of the universal class counts if it appears that, either broadcast storms are not being suppressed or if too many packets are being discarded within an interval, within consecutive intervals, or over a period of several intervals.

As is seen from the above discussion, utilization of the teachings of the present invention may limit the amount of multiple destination traffic through a network or group of networks and, thereby, prevent broadcast storms. Furthermore, if the teachings of the present invention are employed at the network interface level then the control of broadcast storms may be provided at the source of the messages, thus saving network bandwidth.

While the present invention has been described with respect to control of multiple destination messages at both a network switch and a network interface of a workstation of data processing system in a network, the present invention may be utilized individually at only a workstation or a network switch. Furthermore, the teachings of the present invention may be utilized in any network device which routes messages or generates messages and has the capability or can be modified to have the capability to categorize messages, monitor network traffic, count multiple destination messages and discard messages. Thus, while the present invention has been described with respect to a network interface and a switch, the present invention could also be utilized in a router a bridge or other network interconnection device.

Furthermore, while the present invention has been described with respect to suppression of multiple destination messages as they are received, as will be appreciated by those of skill in the art, in light of the present disclosure, multiple destination messages could also be suppressed as they are transmitted. In such a case, the switch 10 would classify and count messages as they are received at a receiving port and discard messages before transmission by the transmitting port.

The present invention has also been described with respect to the receipt and transmission of packets. However, any message format may be utilized with the present invention as long as the messages may be classified by their contents. However, the threshold values may be dependent on the type of messages. Thus, for example, multiple packet messages may be discarded as a single entity but the threshold value should take such a discard process in to account.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of controlling message storms in a network, the method comprising the steps of:

classifying multiple destination messages into a plurality of broadcast message classes based upon characteristics of the broadcast messages;

counting multiple destination messages transmitted for each class of broadcast messages of the plurality of classes of broadcast messages so as to provide a plurality of broadcast message class counts wherein each broadcast message class count corresponds to a class of broadcast message;

transmitting or not transmitting multiple destination messages of a class of broadcast messages based upon the broadcast message class count for the class of broadcast messages;

determining if a multiple destination message has associated with the message a discard override; and retransmitting the multiple destination message irrespective of the class count of the broadcast message class corresponding to the multiple destination message if the multiple destination message has an associated discard override.

2. A system for controlling message storms in a network, comprising:

means for classifying multiple destination messages into a plurality of broadcast message classes based upon characteristics of the broadcast messages;

means for counting multiple destination messages transmitted for each class of broadcast messages of the plurality of classes of broadcast messages so as to provide a plurality of broadcast message class counts with each broadcast message class count corresponds to a class of broadcast message;

means for selectively transmitting or not transmitting multiple destination messages of a class of broadcast messages based upon the broadcast message class count for the class of broadcast messages;

a programmed processor that determines if a multiple destination message request has associated with the request a discard override; and a programmed processor that transmits a multiple destination message corresponding to the multiple destination message request irrespective of the class count of the broadcast message class corresponding to the multiple destination message request if the multiple destination message request has an associated discard override.

3. A system for controlling message storms in a network, comprising:

means for classifying multiple destination messages into a plurality of broadcast message classes based upon characteristics of the broadcast messages;

means for counting multiple destination messages transmitted for each class of broadcast messages of the plurality of classes of broadcast messages so as to provide a plurality of broadcast message class counts with each broadcast message class count corresponds to a class of broadcast message;

means for selectively transmitting or not transmitting multiple destination messages of a class of broadcast messages based upon the broadcast message class count for the class of broadcast messages;

programmed processor for determining a priority associated with the multiple destination message;

programmed processor for determining if the priority of the multiple destination message exceeds a predefined priority threshold; and programmed processor for retransmitting the multiple destination message irrespective of the class count of the broadcast message class corresponding to the multiple destination message if the multiple destination message has an associated priority exceeding the predefined priority threshold.

4. A computer program product for controlling message storms in a network, comprising:

a computer-readable storage medium having computer-readable program code module embodied in said medium, said computer-readable program code module comprising:

computer-readable program code module for classifying multiple destination messages into a plurality of broadcast message classes based upon characteristics of the broadcast messages;

computer-readable program code module for counting multiple destination messages transmitted for each class of broadcast messages of the plurality of classes of broadcast messages so as to provide a plurality of broadcast message class counts with each class count being associated with at least one of the class of broadcast message classes;

computer-readable program code module for transmitting or not transmitting multiple destination messages of a class of broadcast messages based upon the broadcast message class count for the class of broadcast messages;

computer-readable program code module for determining if a multiple destination message request has associated with the request a discard override; and computer-readable program code module for transmitting a multiple destination message corresponding to the multiple destination message request irrespective of the class count of the broadcast message class corresponding to the multiple destination message request if the multiple destination message request has an associated discard override.

5. A computer program product for controlling message storms in a network, comprising:

a computer-readable storage medium having computer-readable program code module embodied in said medium, said computer-readable program code module comprising:

computer-readable program code module for classifying multiple destination messages into a plurality of broadcast message classes based upon characteristics of the broadcast messages;

computer-readable program code module for counting multiple destination messages transmitted for each class of broadcast messages of the plurality of classes of broadcast messages so as to provide a plurality of broadcast message class counts with each class count being associated with at least one of the class of broadcast message classes;

computer-readable program code module for transmitting or not transmitting multiple destination messages of a class of broadcast messages based upon the broadcast message class count for the class of broadcast messages;

computer-readable program code module for determining a priority associated with the multiple destination message;

computer-readable program code module for determining if the priority of the multiple destination message exceeds a predefined priority threshold; and computer-readable program code module for retransmitting the multiple destination message irrespective of the class count of the broadcast message class corresponding to the multiple destination message if the multiple destination message has an associated priority exceeding the predefined priority threshold.

6. A method for controlling message storms in a network including the steps of:

classifying multiple destination messages into a plurality of message classes;

generating class counts for each message class;

transmitting or not-transmitting multiple destination messages based upon the class counts for a message class;

determining if a multiple destination message has associated with the message a discard override notation; and transmitting the multiple destination message irrespective of the class count of the broadcast message class corresponding to the multiple destination message if the multiple destination message has an associated discard override.

7. A method for controlling message storms in a network including the steps of:

classifying at a first node multiple destination messages into a plurality of message classes;

generating at said first node class counts for each message class;

transmitting or not-transmitting at said first node multiple destination messages based upon the class counts for a message class;

determining a priority associated with the multiple destination message;

determining if the priority of the multiple destination message exceeds a predefined priority threshold; and transmitting the multiple destination message irrespective of the class count of the broadcast message class corresponding to the multiple destination message if the multiple destination message has an associated priority exceeding the predefined priority threshold.

* * * * *